US012343762B2

(12) United States Patent
Odom et al.

(10) Patent No.: US 12,343,762 B2
(45) Date of Patent: Jul. 1, 2025

(54) SYSTEM AND METHOD FOR SELF-RETAINING HUNG FLEXIBLE MATERIAL

(71) Applicant: Terex USA, LLC, Norwalk, CT (US)

(72) Inventors: David Odom, Flint, MI (US); David Bryan Stroup, Burt, MI (US); Ryan Anthony Mumm, Newhall, IA (US)

(73) Assignee: Terex USA, LLC, Norwalk, CT (US)

( * ) Notice: Subject to any disclaimer, the term of this patent is extended or adjusted under 35 U.S.C. 154(b) by 0 days.

(21) Appl. No.: 18/442,602

(22) Filed: Feb. 15, 2024

(65) Prior Publication Data

US 2024/0307922 A1 Sep. 19, 2024

Related U.S. Application Data

(60) Provisional application No. 63/445,736, filed on Feb. 15, 2023.

(51) Int. Cl.
*B07B 1/46* (2006.01)

(52) U.S. Cl.
CPC .................................. *B07B 1/4609* (2013.01)

(58) Field of Classification Search
CPC .................................................... B07B 1/4609
USPC ......................................................... 209/399
See application file for complete search history.

(56) References Cited

U.S. PATENT DOCUMENTS 3,970,549 A * 7/1976 Ennis ..................... B01D 35/20
209/403
2024/0307922 A1* 9/2024 Odom ........................ B07B 1/46

FOREIGN PATENT DOCUMENTS

JP H08131955 A * 11/1994

* cited by examiner

*Primary Examiner* — Terrell H Matthews
(74) *Attorney, Agent, or Firm* — Simmons Perrine Moyer Bergman PLC

(57) ABSTRACT

A method and apparatus for allowing access to a screen deck on a vibrating screen which involves bending a flexible barrier sheet upwardly and coupling an upper mounting tab through a flexible sheet mounting tab receiving orifice in said flexible barrier sheet.

19 Claims, 7 Drawing Sheets

SYSTEM AND METHOD FOR SELF-RETAINING HUNG FLEXIBLE MATERIAL

CROSS REFERENCE TO RELATED APPLICATIONS

The present application claims the benefit of the filing date of provisional patent application having Ser. No. 63/445,736 filed on Feb. 15, 2023 by the same inventors, which application is incorporated herein in its entirety by this reference.

FIELD OF THE INVENTION

The present invention generally relates to material processing, and more particularly relates to vibrating screening machines, and, even more particularly, relates to support structure above hung rubber on vibrating screening machines.

BACKGROUND OF THE INVENTION

Heavy equipment in the aggregate industry often needs frequent maintenance due to the wear and tear of processing rock and other minerals. Mechanical screens are typically designed with heavy rubber sheets in the back that serve the dual purpose of retaining material during operation of the screen and allowing maintenance workers an access point that does not need to be unbolted or otherwise removed. Note that access from the front is often impeded by chutes. This rubber is often difficult for maintenance workers to hold up while simultaneously moving past and also has the potential to restrict airflow. Moreover, these hung rubber sheets can hide workers that are inside the machine from those working outside, which increases the potential for accidental operation of the machine while maintenance workers are inside of the machine. Consequently, there is need for a way to ensure an effective barrier, with adequate ability for airflow and a clear line of sight for maintenance personnel.

In the past, workers may have propped open the areas covered by the rubber sheets using pole, rods etc., which are prone to be displaced and thereby slipping and temporarily being useless.

While these types of methods to holding open heavy rubber sheets may have many advantages in particular applications, they also have some drawbacks. For example, with the use of poles some challenges are presented. Firstly, frequently adjusting poles that may have slipped can be time consuming and costly. Secondly, more activity inside the machine causes more occurrence for possibility of injury.

Consequently, there exists a need for improved methods and apparatuses for efficiently supporting heavy rubber sheets in vibrating screen machines.

SUMMARY OF THE INVENTION

It is an object of the present invention to provide an easily implemented system for supporting a heavy rubber sheet in a vibrating screen.

It is a feature of the present invention to utilize a tailgate portion which spans across the screen deck from side to side which has associated therewith tabs or protuberances which are configured to mate with orifices in rubber sheets.

It is an advantage of the present invention to provide for some of the benefits of an ability to hold open heavy sheets without the need for workers to carry tools or implements just for the purpose of holding open the heavy rubber sheets.

It is another object of the present invention to provide an easily implemented method of maintaining an interior portion of a vibrating screen with reduced effort associated with keeping the heavy rubber sheets positioned to allow for airflow and visual inspection.

It is another feature of the present invention to eliminate the need for use of tools to hold open heavy rubber sheets.

It is an advantage of the present invention to provide for a method of making a vibrating screen which incorporates therein equipment for facilitating maintenance thereof without use of tools to hold open heavy rubber sheets.

The present invention is an apparatus and method for efficiently and cost effectively providing support from above for a plurality of heavy rubber sheets, which apparatus and method are designed to satisfy the aforementioned needs, provide the previously stated objects, include the above-listed features, and achieve the already articulated advantages. The present invention is carried out in a "prop pole less system," in a sense that simple changes to the manufacture of the tailgate and the heavy rubber sheets are used, in combination to provide for holding open the areas normally covered by the heavy rubber sheets without the use of poles, tools or other implements by the maintenance workers.

Accordingly, the present invention is a method of maintaining a vibrating screening machine, comprising the steps of:

providing a first flexible barrier sheet which is mounted to the vibrating screening machine at a first mounting point above a first screen deck of the vibrating screening machine, and extends downward toward said first screen deck;

providing a second flexible barrier sheet which is mounted to the vibrating screening machine at a second mounting point above a second screen deck of the vibrating screening machine, and extends downward toward said second screen deck;

bending said first flexible barrier sheet upwardly and coupling an upper mounting tab through a flexible sheet mounting tab receiving orifice in said flexible barrier sheet;

bending said flexible barrier sheet upwardly and coupling a tailgate mounting tab through a flexible sheet mounting tab receiving orifice in said flexible barrier sheet;

wherein said step of bending said first flexible barrier sheet creates an opening above said first screen deck and below the lowest point of said first flexible barrier sheet to permit entrance of maintenance workers therethrough; and wherein said step of bending said second flexible barrier sheet creates an opening above said second screen deck and below the lowest point of said second flexible barrier sheet to permit entrance of maintenance workers therethrough.

Additionally, the present invention is a vibrating screen system comprising:

A multi-deck vibrating screen having a first end and a second end;

said first end having a first flexible barrier sheet having a top side and a bottom side;

said first flexible barrier sheet having a plurality of first flexible sheet mounting bolt receiving orifices therethrough proximal to said top side;

said first flexible barrier sheet being mounted to first clamp bar, through said plurality of first flexible sheet mounting bolt receiving orifices;

said first clamp bar being disposed above a first screen deck;

said first flexible barrier sheet hanging downwardly from said first clamp bar;

said bottom side being distal of said plurality of first flexible sheet mounting bolt receiving orifices; and said bottom side being proximal to said first screen deck;

said first flexible barrier sheet having a plurality of first flexible sheet mounting tab receiving orifices thereon proximal to said bottom side; and a plurality of mounting tabs disposed above said first clamp bar wherein each of said plurality of mounting tabs is sized smaller than one of said plurality of first flexible sheet mounting tab receiving orifices, so that said bottom side of said first flexible barrier sheet is held above said first clamp bar when a portion of one of said plurality of mounting tabs passes through one of said plurality of first flexible sheet mounting tab receiving orifices.

BRIEF DESCRIPTION OF THE DRAWINGS

The invention may be more fully understood by reading the following description of the preferred embodiments of the invention, in conjunction with the appended drawings wherein.

DETAILED DESCRIPTION

Although described with particular reference to inclined multi-level vibrating screens, the systems and methods of the present invention for supporting a flexible sheet can be implemented in many different types of vibrating screen applications.

In one embodiment, the system and method of the present invention described herein can be viewed as examples of many potential variations of the present invention which are protected hereunder.

Figure 1:
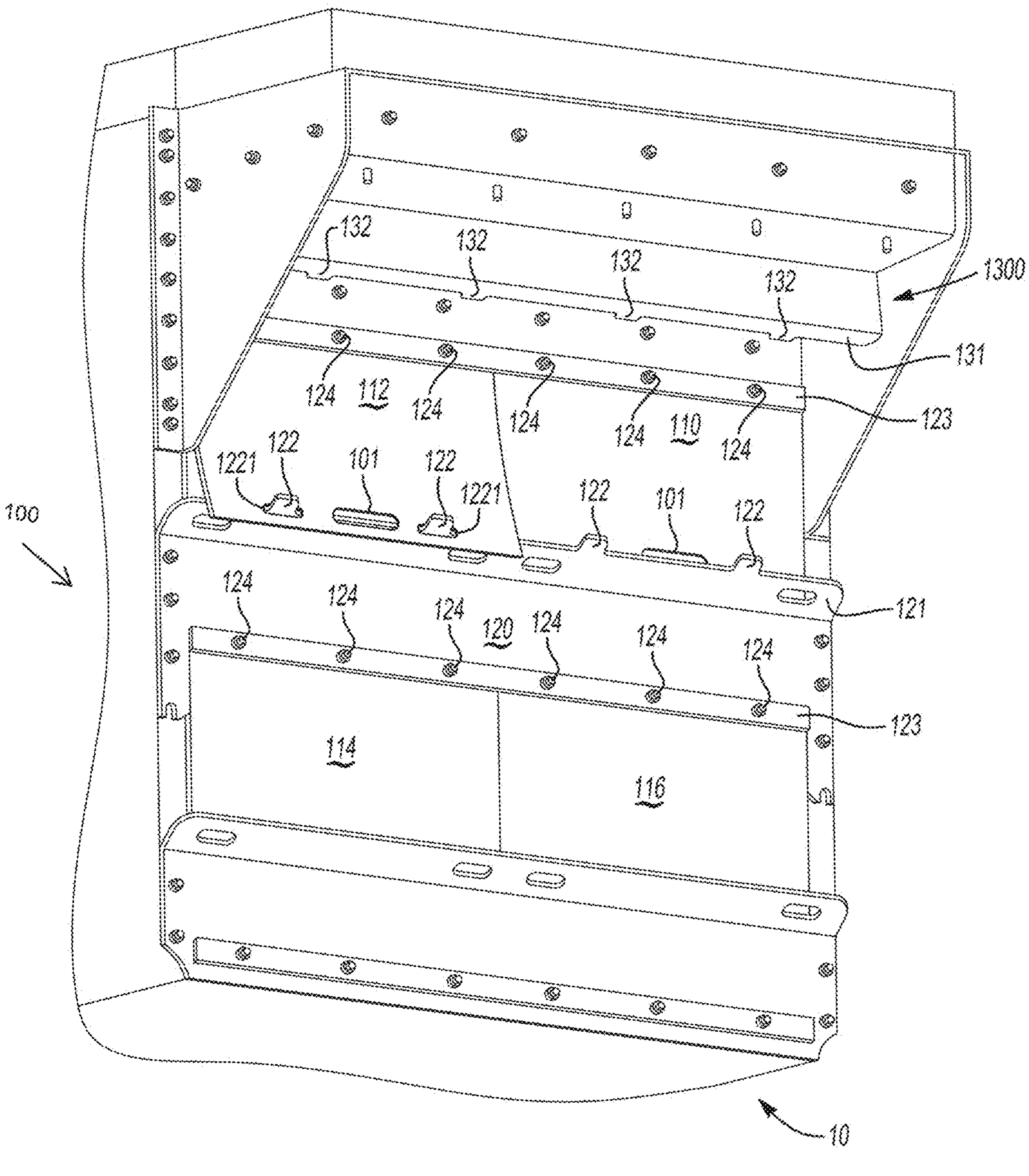
FIG. 1 is a perspective view of a vibrating screening deck of the present invention, which utilizes three rubber sheets 110, 114 and 116 shown in a downward orientation similar to that which might be used during normal operation of the screening machine and a slightly opened configuration of sheet 112.

Now referring to the drawings, wherein like numerals refer to like matter throughout, and more particularly FIG. 1, there is shown a diagram illustrating a version of a rectangular multideck screen deck of the present invention. Where two decks of the multi-deck screen have one end thereof selectively covered by flexible barrier sheets 110, 112, 114 and 116. Throughout this description, these are referred to as heavy rubber sheets but it should be understood that any suitable material could be substituted which provides the necessary properties of flexibility, durability, density etc. Flexible barrier sheet 112 is shown in a slightly different orientation from the other three. There could be some situations where the orientation of flexible barrier sheet 112 is more desirable. Flexible barrier sheet 112 is shown with tailgate mounting tabs 122 extending through the flexible sheet mounting tab receiving orifices 1221 therein. Sheet gripping orifice 101 is shown without any tailgate mounting tabs 122 therein as sheet gripping orifice 101 could be used as a handle by the maintenance workers to bend the flexible barrier sheet 112 and others sheets 110, 114, and 116. Flexible barrier sheet 112 and flexible barrier sheet 110 are shown held in place by clamp bar 123, with flexible sheet mounting bolts 124, which extend through flexible sheet mounting bolt receiving orifices 1241 (FIG. 4).

Figure 2:
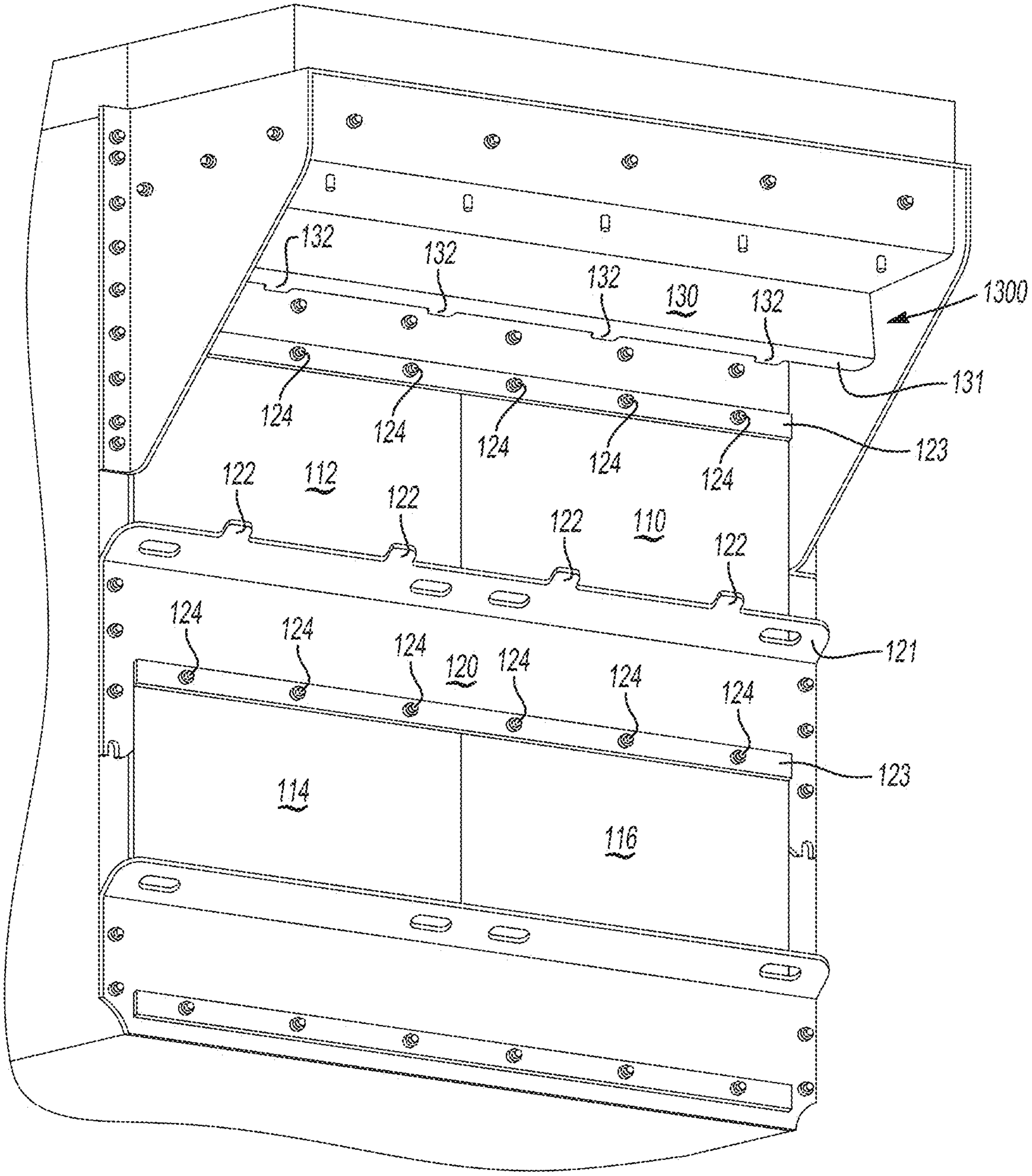
FIG. 2 is a detailed diagram of a flat screen deck of the present invention with all sheets in a fully downward orientation.

Now referring to FIG. 2, there is shown another representation of the details of the system of FIG. 1. Which includes an upper transverse portion 1300 having an upper main portion 130, an upper protruding portion 131 with a plurality of upper mounting tabs 132 thereon.

Figure 3:
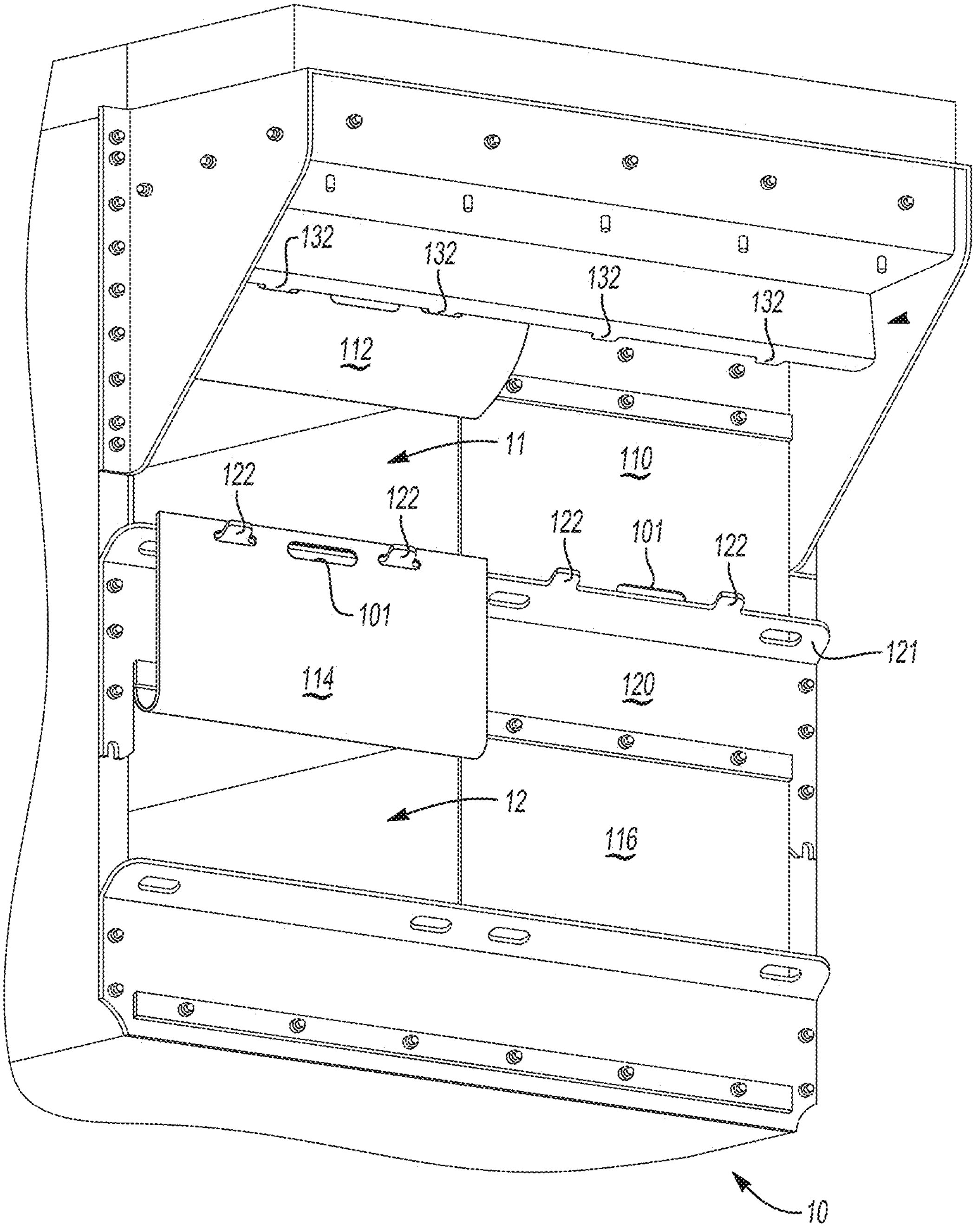
FIG. 3 is a view of the vibrating screen deck of FIG. 1 where the hung rubber on the left is fully flipped up while the hung rubber on the right side is allowed to fully hang down.

Now referring to FIG. 3, there is shown a view of the system of FIG. 1 where the flexible barrier sheet 112 and flexible barrier sheet 114 have been fully flipped up and attached to upper mounting tabs 132 and tailgate mounting tabs 122 respectively. Note that the screen cloth of the vibrating screen is not shown but would be present in an operating vibrating screening machine. Note that with respect to flexible barrier sheet 112 and 114, the majority of the sheets portion shown in FIG. 3 is an opposite side from that which was shown in FIG. 1. Flexible barrier sheets 110 and 116 show the same side in FIG. 3 as in FIG. 1. The flexible sheet mounting tab receiving orifices 1221 (FIG. 4) in flexible barrier sheets 112 and 114 are shown in FIG. 3 as having upper mounting tabs 132 and tailgate mounting tabs 122 extending therethrough, respectively. The upper mounting tabs 132 and tailgate mounting tabs 122 are not shown disposed in the flexible sheet mounting tab receiving orifices 1221 associated with flexible barrier sheets 110 and 116, respectively.

Figure 4:
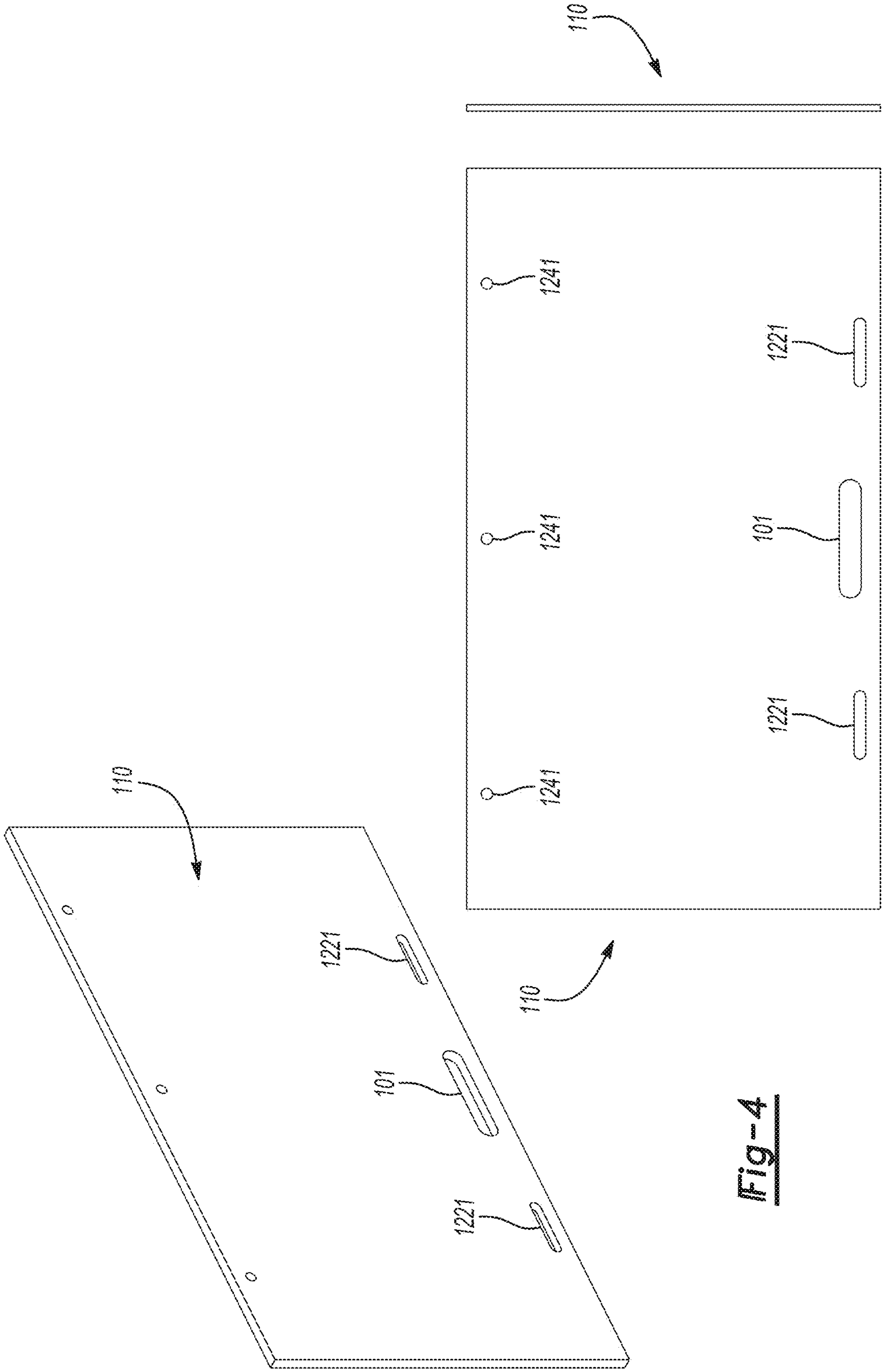
FIG. 4 is a detailed view of a flat pattern of the tailgate portion of the present invention before being formed.

Now referring to FIG. 4, there is shown more details of the flexible barrier sheet 110 which may be identical to the flexible barrier sheet 112, 114, and 116.

Figure 5:
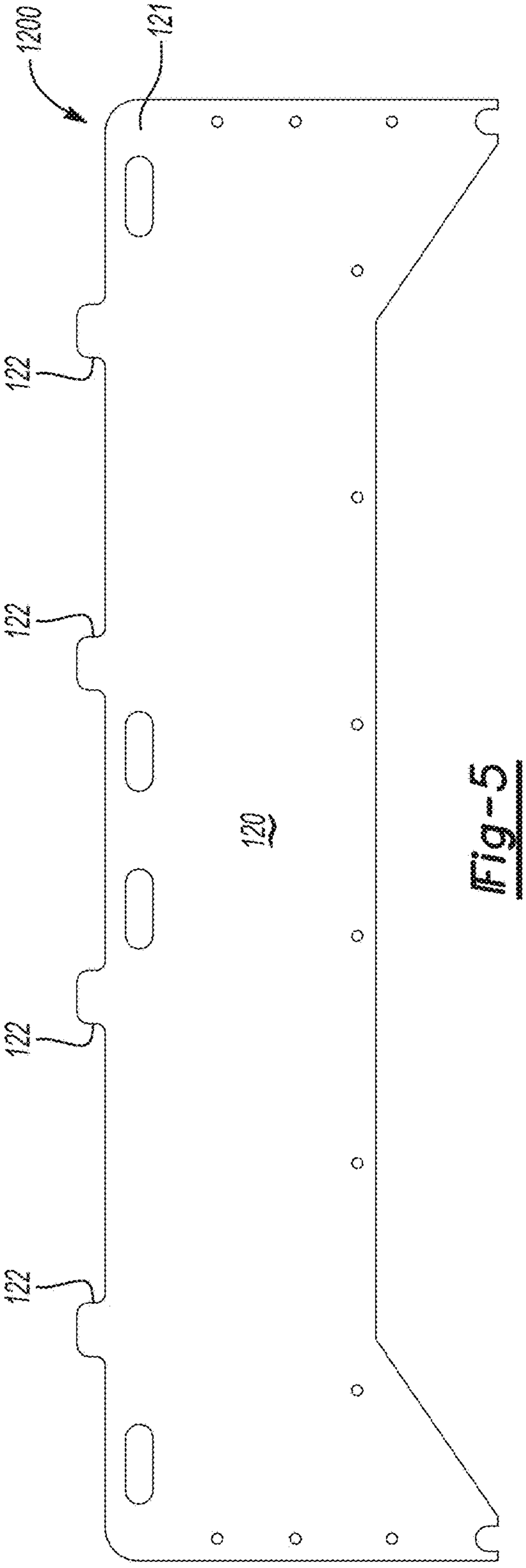
FIG. 5 is a view of an alternate embodiment of the present invention for a flat screen deck using the same tapered cross-members as shown in FIGS. 3 and 4.

Now referring to FIG. 5, there is shown tailgate portion 1200 in a preformed flat configuration with tailgate flat portion 120 and tailgate protruding portion 121 being co-planar.

Figure 6:
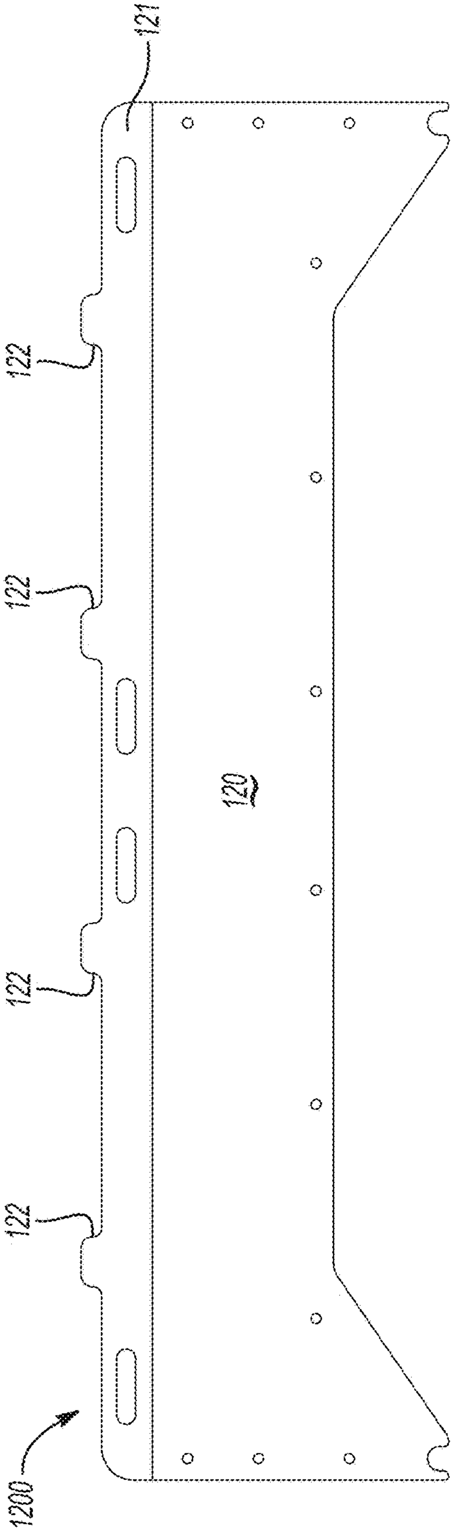
FIG. 6 is a view of the tailgate portion of FIG. 5 after having been formed.

Now referring to FIG. 6, there is shown a side view of the tailgate portion 1200 after being formed with a non-planar orientation between tailgate flat portion 120 and tailgate protruding portion 121.

Figure 7:
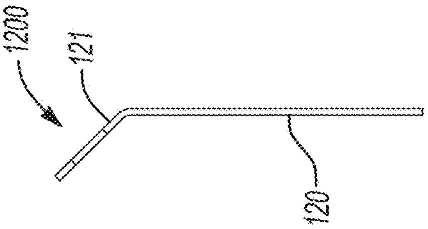
FIG. 7 is an end view of the tailgate portion of FIG. 6.

Now referring to FIG. 7, there is shown an end view of the tailgate portion 1200 of FIG. 6.

Figure 8:
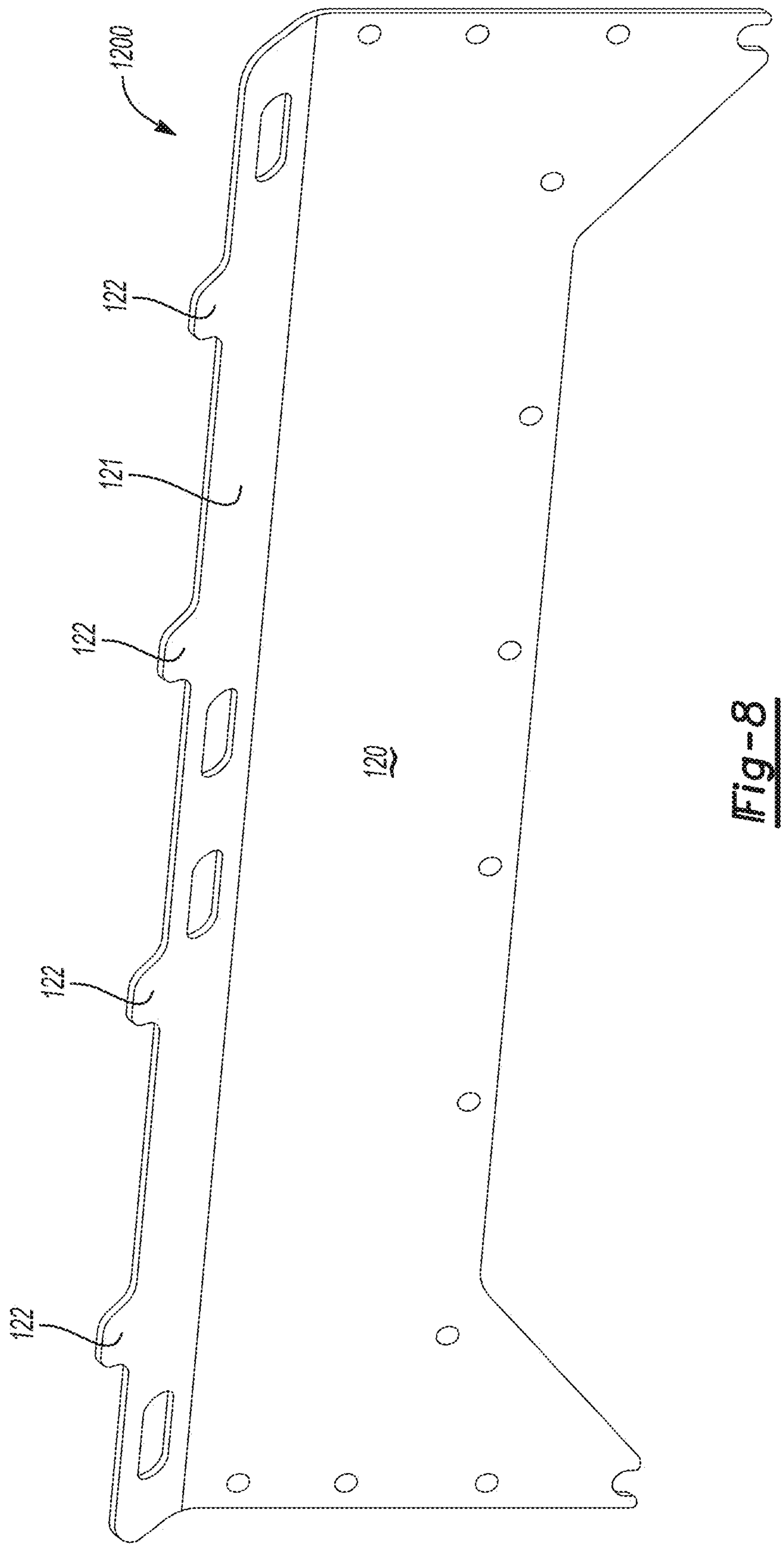
FIG. 8 is a perspective view of the tailgate portion of FIGS. 6 and 7.

Now referring to FIG. 8, there is shown a perspective view of the tailgate portion 1200 of FIGS. 6 and 7.

Figure 9:
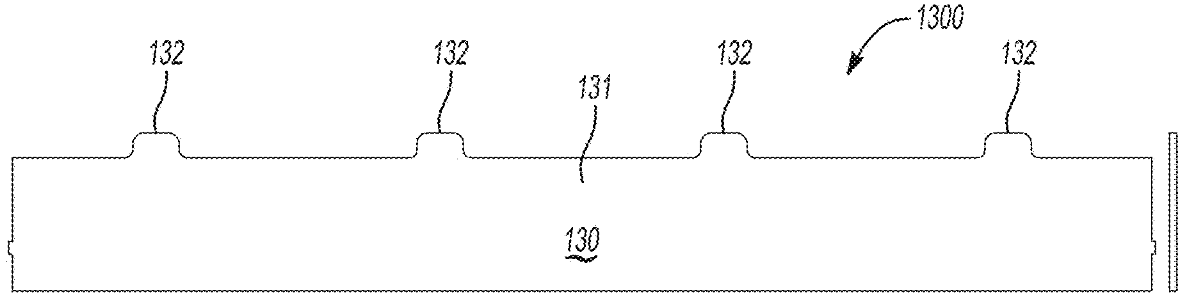
FIG. 9 is a view of an upper transverse portion generally designated 1300 in a flat orientation before being formed.
Figure 10:
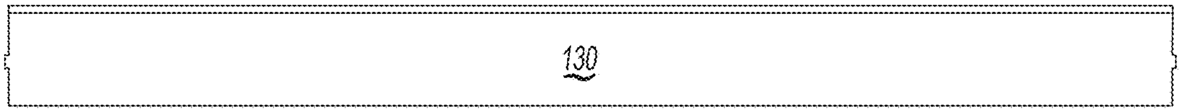
FIG. 10 is a side view of the upper transverse portion 1300 after having been formed.
Figure 11:
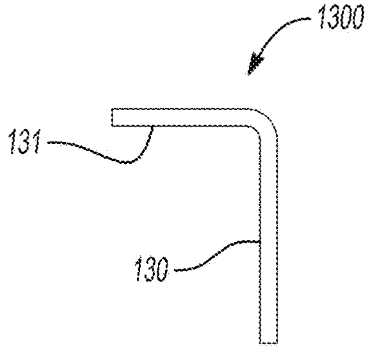
FIG. 11 is an end view of the upper transverse portion 1300 of FIG. 10.
Figure 12:
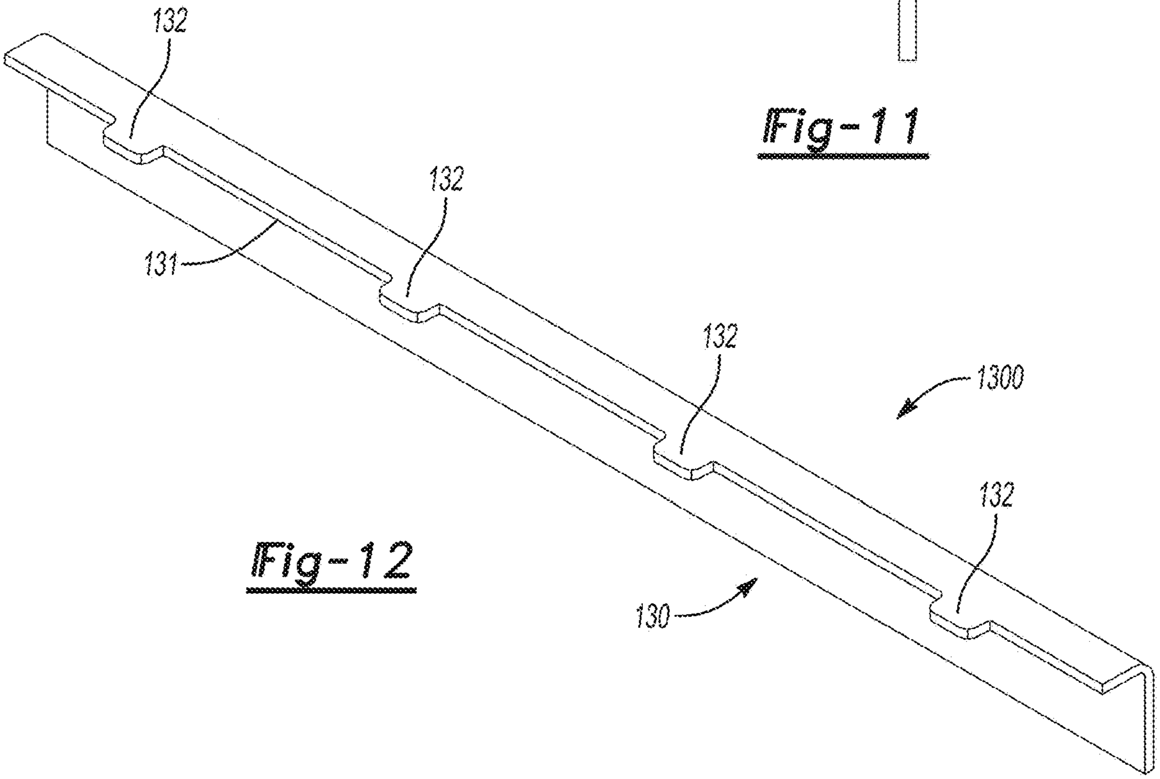
FIG. 12 is a perspective view of the upper transverse portion 1300 of FIGS. 10 and 11.

Now referring to FIGS. 9-12, the upper transverse portion 1300 is shown in a preformed flat pattern in FIG. 9 and in post formed (bent) configuration in FIGS. 10, 11, and 12. In FIGS. 10-12, upper main portion 130 and upper protruding portion 131 are post formed and are not co-planar. Consequently, upper mounting tabs 132 are not co-planar with upper main portion 130. But in all FIGS. 9-12, upper mounting tabs 132 are coplanar with upper protruding portion 131.

The precise implementation of the present invention will vary depending upon the particular application.

It is thought that the method and apparatus of the present invention will be understood from the foregoing description and that it will be apparent that various changes may be made in the form, construct steps and arrangement of the parts and steps thereof without departing from the spirit and scope of the invention or sacrificing all of their material advantages. The form herein described is merely a preferred exemplary embodiment thereof.

We claim:

1. A vibrating screen system comprising:

a multi-deck vibrating screen having a first end and a second end;

said first end having a first flexible barrier sheet having a top side and a bottom side;

said first flexible barrier sheet having a plurality of first flexible sheet mounting bolt receiving orifices therethrough proximal to said top side;

said first flexible barrier sheet being mounted to first clamp bar, through said plurality of first flexible sheet mounting bolt receiving orifices;

said first clamp bar being disposed above a first screen deck;

said first flexible barrier sheet hanging downwardly from said first clamp bar;

said bottom side being distal of said plurality of first flexible sheet mounting bolt receiving orifices; and said bottom side being proximal to said first screen deck;

said first flexible barrier sheet having a plurality of first flexible sheet mounting tab receiving orifices thereon proximal to said bottom side; and a plurality of mounting tabs disposed above said first clamp bar wherein each of said plurality of mounting tabs is sized smaller than one of said plurality of first flexible sheet mounting tab receiving orifices, so that said bottom side of said first flexible barrier sheet is held above said first clamp bar when a portion of one of said plurality of mounting tabs passes through one of said plurality of first flexible sheet mounting tab receiving orifices.

2. The vibrating screen system of claim 1 wherein a perpendicular distance along said first flexible barrier sheet between said top side and said bottom side is sized so that a lowest portion of said first flexible barrier sheet when hung from said mounting tabs, creates an opening above said first screen deck and said lowest portion of said first flexible barrier sheet creates an opening sized and configured for maintenance workers to enter inside said vibration screen system.

3. The vibrating screen system of claim 2 wherein said first screen deck is disposed above a second screen deck.

4. The vibrating screen system of claim 3 wherein said first end having a second flexible barrier sheet having a second sheet top side and a second sheet bottom side;

said second flexible barrier sheet having a plurality of second flexible sheet mounting bolt receiving orifices therethrough proximal to said second sheet top side;

said second flexible barrier sheet being mounted to second clamp bar, through said plurality of flexible sheet mounting bolt receiving orifices;

said second clamp bar being disposed above a said second screen deck;

said second flexible barrier sheet hanging downwardly from said second clamp bar;

said second sheet bottom side being distal of said plurality of flexible sheet mounting bolt receiving orifices;

said second sheet bottom side being proximal to said second screen deck;

said second flexible barrier sheet having a plurality of flexible sheet mounting tab receiving orifices thereon proximal to said second sheet bottom side; and a second plurality of mounting tabs disposed above said second clamp bar wherein each of said plurality of mounting tabs is sized smaller than one of said plurality of flexible sheet mounting tab receiving orifices, so that said second sheet bottom side of said second flexible barrier sheet is held above said second clamp bar when a portion of one of said plurality of mounting tabs passes through one of said plurality of flexible sheet mounting tab receiving orifices.

5. A vibrating screen system comprising:

a vibrating screen having a first end and a second end;

a first flexible barrier sheet mounted at said first end, said first flexible barrier sheet having:

a top edge portion with a plurality of mounting bolt receiving orifices;

a bottom edge portion with a plurality of mounting tab receiving orifices;

a clamp bar securing said top edge portion above a screen deck through said mounting bolt receiving orifices; and a plurality of mounting tabs disposed above said clamp bar, each mounting tab sized to pass through one of said mounting tab receiving orifices to hold said bottom edge portion in an elevated position.

6. The vibrating screen system of claim 5 further comprising:

an upper transverse portion having:

an upper main portion;

an upper protruding portion extending from said upper main portion; and a plurality of upper mounting tabs disposed on said upper protruding portion.

7. The vibrating screen system of claim 5 further comprising:

a tailgate portion having:

a tailgate flat portion;

a tailgate protruding portion extending from said tailgate flat portion; and a plurality of tailgate mounting tabs disposed on said tailgate protruding portion.

8. The vibrating screen system of claim 5 wherein:

said mounting tab receiving orifices are positioned proximal to said bottom edge portion; and said mounting bolt receiving orifices are positioned proximal to said top edge portion.

9. The vibrating screen system of claim 5 wherein:

said first flexible barrier sheet includes at least one sheet gripping orifice configured to be used as a handle for bending said flexible barrier sheet.

10. The vibrating screen system of claim 5 wherein:

said first flexible barrier sheet has a length between said top edge portion and said bottom edge portion sized to create a maintenance access opening when said bottom edge portion is held in said elevated position.

11. The vibrating screen system of claim 5 further comprising:

a second screen deck positioned below said screen deck; and a second flexible barrier sheet mounted above said second screen deck with a second plurality of mounting tab receiving orifices configured to engage with mounting tabs to hold said second flexible barrier sheet in an elevated position.

12. A vibrating screen system comprising:

a vibrating screen;

a flexible barrier sheet having mounting orifices proximate a bottom portion thereof; and a plurality of mounting tabs configured to engage with said mounting orifices to hold said bottom portion of said flexible barrier sheet in an elevated position to create a maintenance access opening.

13. The vibrating screen system of claim 12 wherein:

said flexible barrier sheet includes a top portion mounted to a clamp bar above a screen deck.

14. The vibrating screen system of claim 12 wherein:

said mounting tabs are disposed on an upper transverse portion positioned above said flexible barrier sheet.

15. The vibrating screen system of claim 12 wherein:

said mounting tabs are disposed on a tailgate portion extending across said vibrating screen.

16. The vibrating screen system of claim 12 wherein:

said flexible barrier sheet includes at least one sheet gripping orifice configured as a handle for bending said flexible barrier sheet.

17. The vibrating screen system of claim 12 further comprising:

a second screen deck positioned below a first screen deck; and a second flexible barrier sheet mounted above said second screen deck.

18. The vibrating screen system of claim 12 wherein:

said flexible barrier sheet has mounting bolt receiving orifices proximate a top portion thereof.

19. The vibrating screen system of claim 12 wherein:

said flexible barrier sheet has a length sized to create said maintenance access opening when said bottom portion is held in said elevated position.

* * * * *